(12) United States Patent
Santa Cruz et al.

(10) Patent No.: US 7,059,271 B2
(45) Date of Patent: Jun. 13, 2006

(54) LIVESTOCK SUPPLEMENT DELIVERY SYSTEM

(76) Inventors: Cathy D. Santa Cruz, 7630 Tholl Dr., Reno, NV (US) 89506; Thomas C. Egbert, 655 Country Dr., Fernley, NV (US) 89408

( * ) Notice: Subject to any disclaimer, the term of this patent is extended or adjusted under 35 U.S.C. 154(b) by 0 days.

(21) Appl. No.: 10/770,965

(22) Filed: Feb. 3, 2004

(65) Prior Publication Data

US 2005/0166852 A1    Aug. 4, 2005

(51) Int. Cl.
*A01K 5/15* (2006.01)
*A01K 5/01* (2006.01)

(52) U.S. Cl. .................... 119/60; 119/61.57; 119/51.03

(58) Field of Classification Search ............. 119/51.03, 119/51.01, 58, 60, 61.57; 47/67, 68, 39, 47/40, 41.14; 211/87.01, 88.01, 107; 248/146, 248/311.2, 223.41, 447.2, 27.8, 101, 95, 99, 248/154, 156, 128
See application file for complete search history.

(56) References Cited

U.S. PATENT DOCUMENTS

| | | | | | |
|---|---|---|---|---|---|
| 342,885 | A | * | 6/1886 | Thompson et al. | 119/51.03 |
| 485,328 | A | * | 11/1892 | Lee | 119/51.03 |
| 488,851 | A | * | 12/1892 | Stock | 119/69 |
| 518,819 | A | * | 4/1894 | Lee | 119/51.03 |
| 586,148 | A | * | 7/1897 | Tobias | 119/51.03 |
| 590,458 | A | * | 9/1897 | Lee | 119/51.03 |
| 646,762 | A | * | 4/1900 | Reser | 248/97 |
| 1,693,113 | A | * | 11/1928 | Hampel | 119/61.57 |
| 1,879,332 | A | * | 9/1932 | Kulp | 119/61.57 |
| 1,930,673 | A | * | 10/1933 | Consolazio | 248/315 |
| D118,124 | S | * | 12/1939 | Maclean | D30/121 |
| D146,408 | S | * | 2/1947 | Hyde | D30/127 |
| 2,518,549 | A | * | 8/1950 | Hyde | 119/60 |
| 2,965,344 | A | * | 12/1960 | Baker | 248/101 |
| 3,140,692 | A | * | 7/1964 | Beyea | 119/51.03 |
| 3,273,537 | A | * | 9/1966 | Orr | 119/51.03 |
| 3,362,382 | A | * | 1/1968 | Frasier | 119/58 |
| 3,661,121 | A | * | 5/1972 | Zielin | 119/61.57 |
| 3,888,442 | A | * | 6/1975 | Comeaux | 248/98 |
| 4,303,040 | A | | 12/1981 | Mann | 119/62 |
| 5,033,703 | A | * | 7/1991 | Allen, Sr. | 248/97 |
| 5,036,799 | A | * | 8/1991 | Jordan et al. | 119/61.57 |
| 5,188,060 | A | * | 2/1993 | Johnson | 119/58 |
| 5,189,985 | A | * | 3/1993 | Brady et al. | 119/60 |
| 5,201,279 | A | | 4/1993 | Impastato et al. | 119/51.03 |
| 5,375,559 | A | * | 12/1994 | Baadsgaard | 119/58 |
| 5,630,375 | A | | 5/1997 | Mann | 119/51.03 |
| 5,899,170 | A | * | 5/1999 | Muckler | 119/58 |
| 6,053,124 | A | | 4/2000 | Kolbe | 119/51.01 |
| 6,360,689 | B1 | * | 3/2002 | Weinert | 119/51.01 |
| 6,581,540 | B1 | * | 6/2003 | LaVanish | 119/51.01 |

OTHER PUBLICATIONS

Protected Feeder for Livestock.
Food Supplement Dispensing System for Animals.
Livestock Feeder.
Apparatus for Feeding Granulated Feed Supplements to Livestock.

* cited by examiner

Primary Examiner—Son T. Nguyen

(57) ABSTRACT

A livestock supplement delivery system that is completely portable and is easily attachable and/or useable with any type of support surface of user choice, such as a fence post or the like. The system includes different embodiments but each embodiment provides the unusual results of protecting any exposed edges that would allow an animal to easily bite off a large chunk thereof. Thus, the animal can only ingest the supplement via licking rather than biting and results in controlled more regulated consumption.

9 Claims, 2 Drawing Sheets

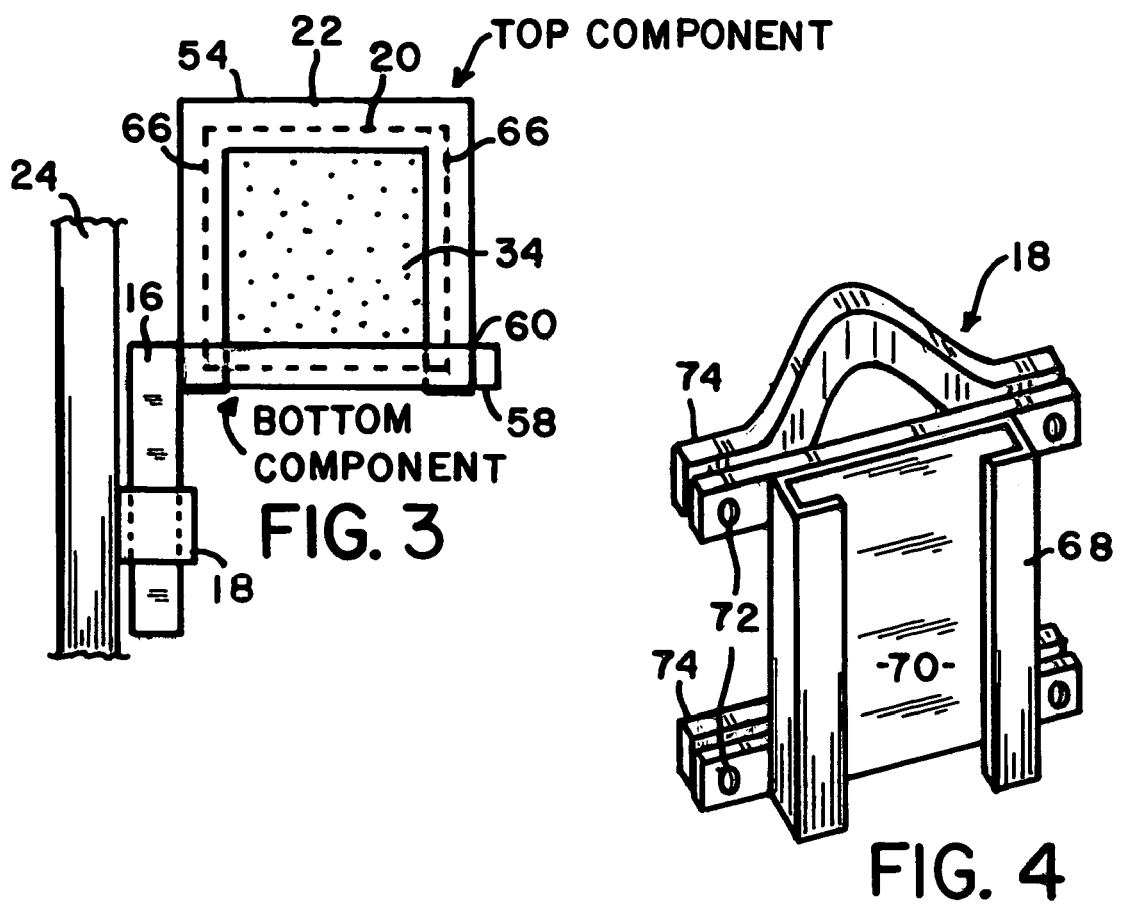
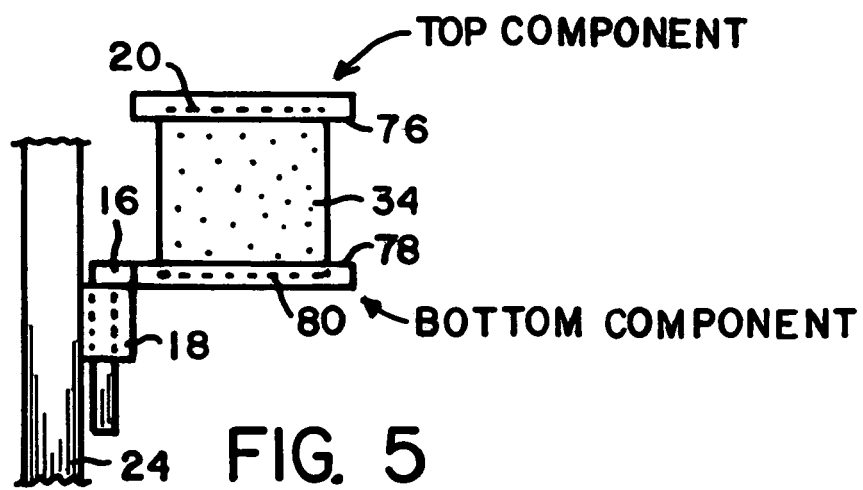

1

LIVESTOCK SUPPLEMENT DELIVERY SYSTEM

FIELD OF THE INVENTION

This invention relates in general to devices and/or systems used for providing livestock with essential nutrients in a controlled, systematic and regulated manner. However, the invention more particularly pertains to a holder for the nutrients that allows the animal to lick the substance therein but the holder protects the exposed edges thereof so as to reduce the chances of the animal taking a large chunk off in one bite. Also, the holder is completely portable and removably attachable onto any type of typical fence post of user choice.

BACKGROUND OF THE INVENTION

Within the known prior art, there have been numerous attempts to develop a suitable system for delivering supplements to livestock in a controlled manner. Unfortunately until now, such a system has not heretofore been provided, as within all of the known prior art there are inherent disadvantages and drawbacks that the present invention recognizes, addresses, and resolves in a new and novel manner.

One example of related prior art includes U.S. Pat. No. 4,023,533, issued on May $17^{th}$ 1977, entitled "PROTECTED FEEDER AND/OR INSECTICIDE APPLICATIOR FOR LIVESTOCK", in the name of Fred W. Mann. Wherein, the invention as taught comprises a feeder receptacle situated on the ground upon up-raised legs and the general function of the device is to include a receptacle and an insecticide with dispensing means in combination. Whereby when the animal desires access to the supplement, they must first activate the dispensing means. Thus the animal will be sprayed with the insecticide before they are allowed to eat the supplement.

Another example of related prior art includes U.S. Pat. No. 4,303,040, issued on Dec. $1^{st}$ 1981, entitled "PROTECTED FEEDER FOR LIVESTOCK", in the name of Fred Mann. This device is somewhat similar to the first cited reference being that it still teaches a feeder receptacle supported upon leg members that are situated upon the ground surface. However, the use of insecticide is not inherent and the overall function in this case is to encourage the animal to lift a lid section, respectively, before they are allowed access to the contents within the receptacle. Thus, the specific purpose of the invention is to provide a protected covering for the noted contents so as to eliminate exposure to outside elements such as weather and contamination.

Other types of livestock feeders are taught in U.S. Pat. No. 5,201,279 and U.S. Pat. No. 6,053,124, each of which are designed for use with liquid supplements only. Although both of the cited patents are somewhat functional for their intended use they are very limited and not suitable for use with any other types of non-liquid supplements, as is the present invention.

It is therefore contended by the applicants that there is a great need for improvement regarding livestock feeders in general. It is to be understood the most common disadvantage with the supplement systems currently available is the fact that the animal has access to any exposed edges thereof. For example, if the supplement is in the form of a block, such as either a typical salt, mineral or molasses block, it is formed having squared edges respectively. This is most unfortunate as this allows the animal to easily bite off a large chunk thereof, thus defeating the entire purpose of providing a controlled regulated dispersal means.

Also, most typical containers used for feeding supplements are inconvenient to use and until now there has not been a universal support bracket that allows the container to be supported off of the ground surface in a secure, stable manner, such as taught by the present invention. Furthermore a very important advantage of the present invention is that it is very safe to use unlike the associated prior art. For example, typical containers available today include a plastic type rim thereon, this is very dangerous as the animal can easily chew on the rim and even choke due to ingesting pieces of the plastic from the container. These problems are inherent drawbacks associated with most of the related prior art and the present invention, recognizes, addresses, and resolves these problems in a new and improved manner that heretofore has not been incorporated.

SUMMARY OF THE INVENTION

It is therefore a primary object of the present invention to provide a livestock supplement delivery system that includes a universal bracket for supporting a unique holder thereon and is used for containment of supplements and/or feeds that are in the form of a block, respectively. Whereby, due to the structure and shape of the holder, any exposed edges of the block supplement are protected and an animal cannot easily bite off a chunk thereof, or bite the edge of the container. This is most important as most block supplements are intended to be ingested via licking rather than biting, as the latter allows the animal to over indulge themselves and this in turn may cause numerous health problems.

Another object of the present invention is to provide a livestock supplement delivery system that is of very simple construction, eliminates parts associated with the known prior art, and is economical to produce and sell. Also, the mounting bracket is constructed so as to be universal and removably attachable onto any type of typical fencing, such as round posts, square posts, stakes, wooden posts, or any upright structure such as a wall or onto the outside of a livestock trailer, etc.

Yet another important object of the present invention is to provide a livestock supplement delivery system that is most useful with any standard type block supplement such as a salt or molasses. However, the system is also usable with any other types of supplement that may be of a shape other than squared, such as circular, oblong, rectangular, etc, and/or other types of feed stuffs such as grain, cubes, pellets, etc.

Still a further object of the present invention is to provide a livestock supplement delivery system that can be made from any suitable material of engineering choice, such as wood, plastic, metal, or the like.

Another object of the present invention is to provide a livestock supplement delivery system that is completely portable and does not require any specialized tools and/or skills for installation.

Also a further object of the present invention is to provide a livestock supplement delivery system that may be sold and produced as a complete kit having all the necessary components and installation instructions, or the components may be sold and purchased independently.

Other objects and advantages will be seen when taken into consideration with the following drawings and specification.

BRIEF DESCRIPTION OF THE DRAWINGS

FIG. 3 is substantially an overview for a second embodiment of the present invention.

FIG. 4 is substantially a perspective view for a mounting bracket.

FIG. 5 is substantially an overview for a third embodiment for the present invention.

DETAILED DESCRIPTION OF THE INVENTION

Figure 1:
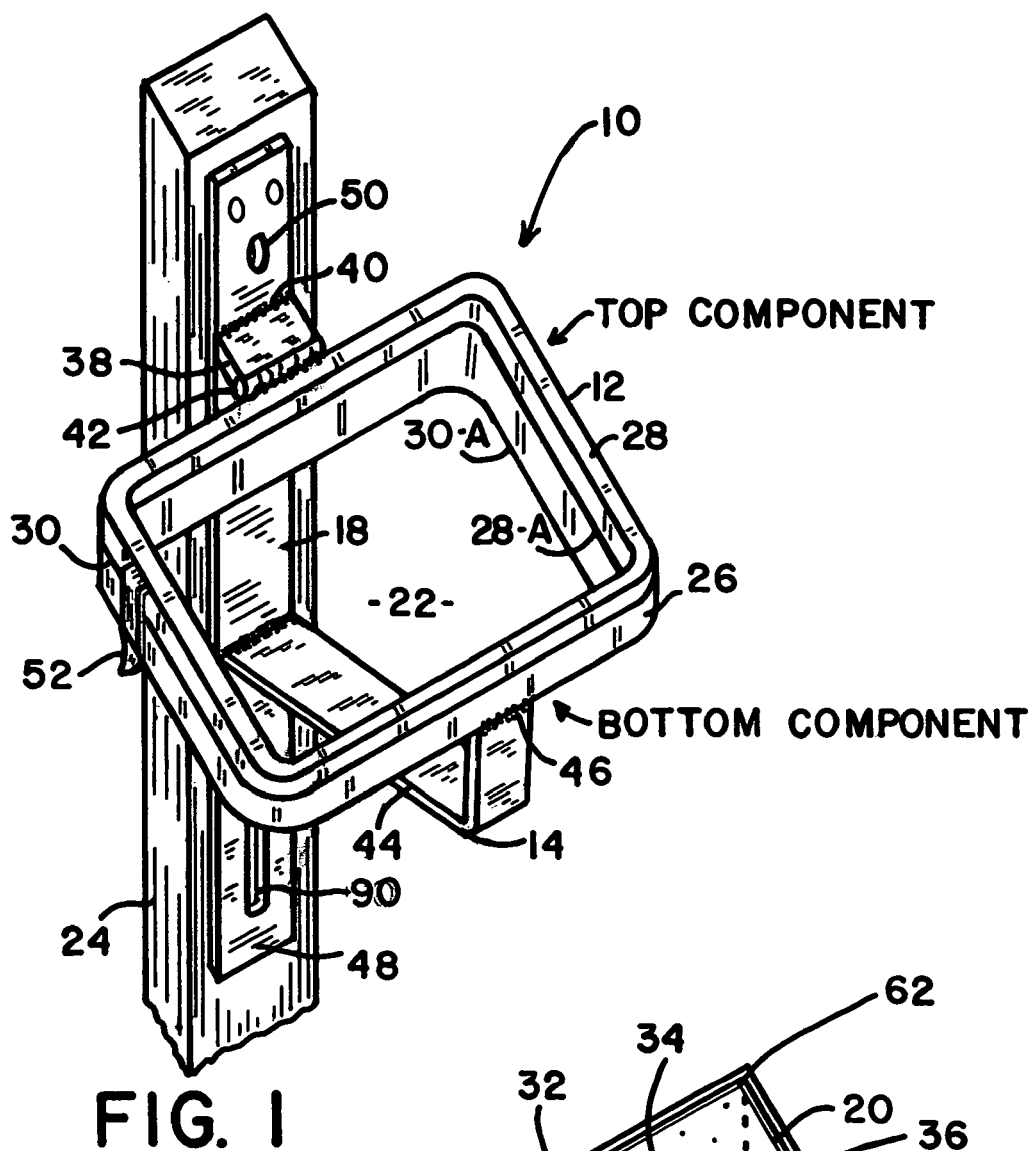
FIG. 1 is substantially a perspective view depicting a first embodiment for the present invention.

Referring now in detail to the drawings wherein like characters refer to like elements throughout the various views. As depicted throughout the drawings, (10) represents an overview for the livestock supplement delivery system of the present invention. It is to be noted within the following specification the general structure and system will first be described as each embodiment includes common characteristics and provides the overall unusual end results. Thus the following describes the common characteristics, respectively.

The livestock supplement delivery system (10) substantially consists of a top component (12), a bottom component (14), an attachment plate (38) and a support element (18). As can be seen within each of the views, each component (12 & 14) in combination form substantially a receptacle that is of a shape and size to removably receive and support an item therein. The item having an exposed top edge (20) and when the item is positioned within the receptacle, top component (12) provides a protective covering for the exposed top edge (20). As further depicted throughout the views, top component (12) provides an access opening (22) therein that allows access there through to any smooth surfaces on the item yet restricts access to exposed top edge (20). Further depicted throughout the various views the receptacle is attached onto support element (18) by attachment plate (38) and support element (18) being attachable onto an upright support surface (24) by an attachment means.

Figure 2:
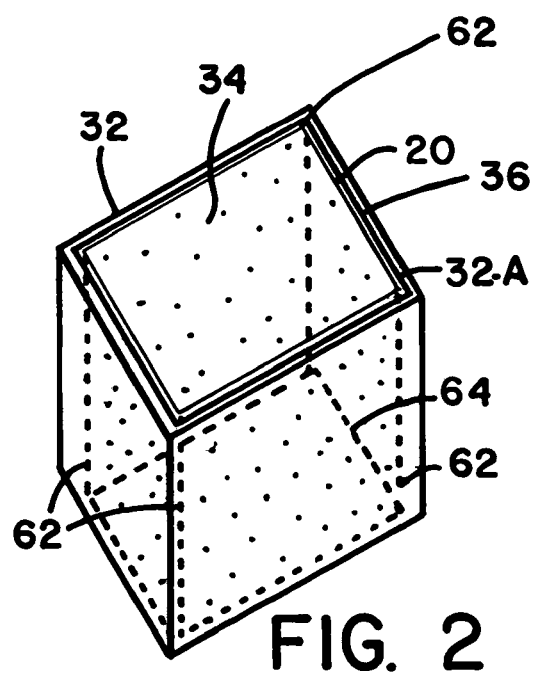
FIG. 2 is substantially a perspective view that is drawn to a smaller size and depicts a form of the livestock supplement when positioned within a container.

Referring now to the first embodiment as depicted in figures 1 & 2, wherein top component (12) is formed from a lower frame (26) and an upper frame (28). Lower frame (26) having a top ridge (30) and upper frame (28) is substantially in the form of a rim. Thus it can be seen top ridge (30) provides a first inside measurement (30-A) and the rim provides a second inside measurement (28-A), with second inside measurement being less than first inside measurement. As depicted in figure 2, the noted item is removably positioned within a container (32) and in this embodiment the item is a livestock supplement (34). Container (32) having an open top which forms an interior top edge (36) and the interior top edge provides a third measurement (32-A) which is less than first inside measurement (30-A) yet more than second inside measurement (28-A). Therefore, it can now be understood that when container (32) (which has item therein) is positioned within the receptacle and upper frame (28) is positioned thereon, upper frame (28) not only provides the previously noted protective covering for exposed top edge (20) but also provides covering for top ridge (30) and interior top edge (36).

As previously noted, the receptacle is attached onto the support element by the noted attachment member and within the first embodiment the noted attachment member is in the form of an attachment plate (38) having a first end and a second end. The first end of the attachment plate (38) being attached onto lower frame (26) by suitable fastening means of choice. The second end of attachment plate (38) being attached onto support element (18) by suitable fastening means and upper frame (28) being attached onto the first end of attachment plate (38) by a fastening member. It is to be noted any type of fastening means and/or fastening member of engineering choice may be incorporated. Therefore FIG. 1 exemplifies a first embodiment wherein the noted suitable fastening means is welding (40). Furthermore, the fastening member is a hinge (42) that is most advantageous as this allows upper frame (28) to be pivotably mounted.

As further depicted in figure 1, the noted receptacle is attached onto support element (18) by attachment plate (38) and within the first embodiment we further include the bottom component (14) being in the form of an L-shaped attachment leg (44) having a first attachment end and a second attachment end. As can be seen the first attachment end is fixedly attached onto support element (18) by suitable fastening means, such as welding, and the second end is fixedly attached onto lower frame (26) by suitable fastening means, such as welding (46).

Still further as depicted in figure 1, the support element (18) is in the form of an elongated bracket (48) having attachment means thereon for attaching elongated bracket (48) onto upright support surface (24). It is to be noted any suitable type of attachment means of engineering choice may be incorporated, such as the attachment means may include at least one mounting hole that is of a shape and size to receive a fastener there through such as either a nail (50) a screw, bolt, or a variant thereof. However, the elongated bracket may further include numerous holes and/or slots (90) so as to allow the bracket to be easily mounted onto any suitable upright support surface of choice. This is important as this allows the bracket to be easily mounted onto either a pole, any type of fence post irrespective of shape or size and/or even onto a wall or the side of a livestock trailer.

Still further depicted in FIG. 1 lower frame (26) and upper frame (28) are removably attached together by a spring metal clip (52) or the like and which functions to retain upper frame (28) in a closed position on top of frame (26).

It is to be understood the embodiment of FIG. 1 is very advantageous as the receptacle and container (32) in combination are not only suitable for use with a solid type of livestock supplement but they are also functional for other supplements, such as grain, corn, bran, etc., or more importantly even a liquid supplement. However one possible disadvantage of this embodiment is being that the upper frame is substantially open, the supplement is exposed to outside elements. Thus, rain or melting snow may accumulate upon the exposed top surface thereof. One possible means for resolving this problem may be to include drainage holes within the bottom of container (32) and within the actual supplement itself so as to allow drainage there from.

Referring now to FIG. 3, which depicts a second embodiment for the present invention. As shown therein, the top component is in the form of an upper frame (54) that is supported by downwardly extending legs (56). The bottom component being in the form of a lower frame (58) having openings (60) therein for slidably receiving downwardly extending legs (56) there through. In this embodiment the container has been eliminated and the item is the actual livestock supplement and it must be in solid form. Thus, the supplement (34) in solid form provides not only the noted exposed top edge (20) but also at least four corner edges (62)

and a bottom edge (64) (only depicted in FIG. 2 for clarity purposes). As can be seen in FIG. 3, downwardly extending legs (56) are each shaped so as to form internal corners (66) that are of a shape and size to substantially mate with and receive each of the corner edges (62) therein. Thus, the internal corners (66) provide protective covering for each of the four corner edges (62), and the lower frame provides protective covering for the bottom edge (64). Whereby, it can be seen the smooth surfaces on the item, namely on supplement (34) are accessible yet the four corner edges (62) and the bottom edge (64) are not accessible.

This embodiment provides different results than the first embodiment. For example, as the animal licks the smooth surfaces of the supplement, the supplement becomes smaller overall in general. Therefore, due to the weight and/or pressure exerted onto the supplement from the top component, the legs will slowly descend into their respective openings (60). Whereby, the user can visually determine the amount of supplement that has been consumed and also this visually notifies the user when the supplement needs to be replaced. Also, in this embodiment drainage for any accumulated snow or water is less likely to present a problem. This is resolved due to the sides of the supplement not being confined within a container, thus drainage is automatic. However, if so desired within this embodiment the access opening (22) may be eliminated, because access to the top surface need not be provided as the animal can easily lick the sides thereof. Thus, it can be seen without access opening (22), snow or water cannot accumulate thereon which is most advantageous. Another inherent advantage to this embodiment is that both upper and lower component can be easily formed by an injection mold with the upper component having each of the extension legs (56) being integrally formed. This is then very cost efficient and eases manufacturing.

The embodiment of FIG. 3 can easily be supported by one stake member, (not shown for clarity purposes) and attached beneath the lower component or frame (58). With the stake member having a first end fixedly attached onto frame (58) and an opposing end driven into a support surface, such as within the ground. However, if this is not desirable then the following support means may be incorporated depending on engineering and/end user wishes.

As can further be seen in FIG. 3, the receptacle is attached onto a support element (18) by an attachment member (16) which is substantially in the form of an L-shaped bracket providing a long leg and a short leg, with the short leg being fixedly attached onto the bottom component, namely lower frame (58) and the long leg extending downwardly there from. In this embodiment the support element (18) is in the form of an attachment bracket that is of a shape and size to removably slidably receive and support the long leg therein, and the attachment bracket being fixedly attached onto the upright support surface (24), such as onto a fence post or the like by a suitable attachment means. It is to be understood any suitable type of an attachment means may be incorporated, thus the attachment means as follows and as depicted in FIG. 5 is only exemplary of possible bracket formation.

Referring now to FIG. 4, wherein the support element (18) includes an attachment bracket (68) having a recess (70) for slidably receiving and supporting the long leg therein. Attachment bracket (68) further including the previously noted attachment means for attaching the bracket (68) onto the support surface (24). Whereby attachment bracket (68) includes mounting holes (72) and a first and a second mounting plate (74). Each mounting plate (74) also includes mounting holes, each of which are of a shape and size to mate with a corresponding hole (74) when aligned therewith and mounted. Thus, the attachment bracket (68) and each mounting plate (74) can be affixed onto the support surface via mounting holes (72) and suitable fasteners when positioned there through. It is to be noted any suitable fasteners of choice may be used, such as a nail, a screw, bolt and a nut, or a variant thereof.

The shape of the mounting plate (74) is to be variable so as to allow the mounting plates to be functional with different types of support surfaces. Thus, the mounting plates as depicted herein are functional for attachment onto a typical metal substantially V-shaped or T-shaped steel fence post. However, if shaped differently such as round or square, the attachment bracket (68) can be easily adapted for use with substantially any type of support surface of user choice.

Referring now to FIG. 5, wherein we depict yet another embodiment for the present invention. As shown therein, top component is substantially in the form of a circular ring (76) that is formed having an internal inwardly facing rim and an internal downwardly facing rim. Furthermore, in this embodiment the bottom component is in the form of a circular ring (78) having an internal inwardly facing rim and an internal upwardly facing rim. Also, in this embodiment the item is a livestock supplement in solid form yet is cylinder shaped thus providing the noted exposed top edge (20) and an exposed circular bottom edge (80). Whereby, it can be seen when the item, namely in this case the cylinder shaped supplement, is positioned within the receptacle formed between each ring (76 & 78), the bottom component provides a protective covering for the exposed circular bottom edge (80). It is to be noted if so desired the first circular ring (76) may be formed as a lid, thus the access opening (22) would be eliminated. Also, each of the rings (76 & 78) may be made from any suitable material of choice, such as metal, plastic, etc. Finally, the embodiment of FIG. 5 can be easily mounted by any suitable means of choice, such as taught within the mounting description associated and described for FIG. 3. However, in this embodiment the short leg of the attachment member (16) is to be fixedly attached onto the circular ring (78).

It can now be seen we have herein provided a new, improved, and most novel livestock supplement delivery system that overcomes the inherent disadvantages and drawbacks associated with the known prior art in a manner heretofore not taught. The system is cost efficient, simple to install and use, is completely portable, is adaptable for use with any type of support surface, and which can be manufactured from numerous materials and/or components of engineering choice.

Although the invention has been herein shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatuses.

The invention claimed is:

1. Livestock supplement delivery system comprising: a rim; a lower frame; an L-shaped attachment leg; an attachment plate; an elongated bracket; a container; a livestock supplement having an exposed top edge; and an upright support surface; said lower frame and said rim being removably attached together by a spring metal clip, said rim with said lower frame and said bottom L-shaped attachment leg in combination form a receptacle, said receptacle being of a shape and size to removably receive and support said container therein, said livestock supplement being positioned within said container, said rim providing a protective covering for said exposed top edge, said attachment plate having a first end and a second end, said first end being attached onto said lower frame, said second end being attached onto said elongated bracket, said rim being attached onto said first end by a hinge that allows said rim to be pivotably mounted, said L-shaped attachment leg having a first attachment end and a second attachment end, said first attachment end being fixedly attached onto said elongated bracket, said second attachment end being fixedly attached onto said lower frame, and said elongated bracket being removably attached onto said upright support surface, whereby:

when said container having said livestock supplement therein is positioned within said receptacle and said rim is positioned thereon, said rim provides said protective covering for said exposed top edge.

2. The livestock supplement delivery system of claim 1 wherein said lower frame further provides a top ridge, said top ridge providing a first inside measurement, said rim providing a second inside measurement, said second inside measurement being less than said first inside measurement, said container having an open top which forms an exterior top edge, said exterior top edge providing a third inside measurement, and said third inside measurement being less than said first inside measurement yet more than said second inside measurement, whereby:

when said container having said item therein is positioned within said receptacle and said upper frame is positioned thereon, said top component provides said protective covering for said exposed top edge, said top ridge, and said exterior top edge.

3. The livestock supplement delivery system of claim 1 wherein said receptacle being attached onto said support element by said attachment member including, said attachment member being in the form of an attachment plate having a first end and a second end, said first end being attached onto said lower frame by suitable fastening means, said second end being attached onto said support element by suitable fastening means, and said upper frame being attached onto said first end by a fastening member.

4. The livestock supplement delivery system of claim 3 wherein said fastening member is a hinge that allows said upper frame to be pivotably mounted.

5. The livestock supplement delivery system of claim 3 wherein said receptacle being attached onto said support element by said attachment member further including said bottom component being in the form of an L-shaped attachment leg having a first attachment end and a second attachment end, said first attachment end being fixedly attached onto said support element by suitable fastening means and said second attachment end being fixedly attached onto said lower frame by suitable fastening means.

6. The livestock supplement delivery system of claim 5 wherein each said suitable fastening means is welding.

7. The livestock supplement delivery system of claim 3 wherein each said suitable fastening means is welding.

8. The livestock supplement delivery system of claim 1 wherein said support element is in the form of an elongated bracket having attachment means thereon for attaching said support element onto said upright support surface, said attachment means including at least one mounting hole that is of a shape and size to receive a fastener there through.

9. The livestock supplement delivery system of claim 8 wherein said fastener is in the form of a nail, or a screw, or a variant thereof.

* * * * *